United States Patent Office 2,781,275
Patented Feb. 12, 1957

2,781,275

VISCOSE SOLUTION AND METHOD OF SPINNING

Dirk Vermaas, Baarn, Netherlands, assignor to American Enka Corporation, Enka, N. C., a corporation of Delaware No Drawing. Application April 7, 1952,
Serial No. 281,036

Claims priority, application Netherlands May 12, 1951

2 Claims. (Cl. 106—165)

This invention relates to viscose products and a process for manufacturing them. More particularly, the invention relates to a process for manufacturing artificial products such as threads, fibers, films and the like, from viscose wherein the gel structure in the products obtained is almost uniform over the entire cross-section.

The molecular arrangement or gel structure of products previously manufactured from viscose has in many respects not been homogeneous over the cross-section. For example, in the case of high tenacity rayon tire yarn, large variations occur in going from the so-called "skin" portion to the inner or "core" portion insofar as the optical behavior, specific gravity, permeability to liquids, and absorption and retention of dye stuffs are concerned. It is usually said that such products have a "skin-core" difference. These differences between the skin and the core may be very large, depending on the conditions under which the products are made. In general, the swelling, absorption of dye stuffs and permeability to liquids are larger in the core of such products than in the skin. Dye stuffs which have been absorbed, on the other hand, are retained by the skin better than by the core. For example, when washing a dyed thread which has a "skin-core" difference, the resistance of the skin to the removal of the dye stuff may be several times greater than the resistance of the core.

This invention has as an object to produce new viscose products having improved physical properties.

Another object is to provide a process for manufacturing viscose products which have improved physical properties.

A further object is to provide a process for manufacturing viscose products which have a uniform gel structure over the entire cross-section.

An additional object is to provide a process for manufacturing viscose products which have improved properties with regard to liquid permeability, swelling, and absorption and retention of dye stuffs.

Another object of this invention is to provide a process for manufacturing viscose products which have substantially no skin-core differences.

A still further object of this invention is to provide a process for manufacturing viscose products which have a uniform gel structure over the entire cross-section and which have properties similar to those found in the skin layer of other viscose products.

In accordance with this invention, improved products which have a uniform gel structure over the entire cross-section are manufactured by starting with a specially prepared zinc-containing viscose which has been treated to remove the sodium trithiocarbonate.

It has been found that in order to obtain a product with uniform properties over the whole cross-section with the average spinning bath, two conditions must be fulfilled: there must be zinc present in the viscose, and there must be a complete, or almost complete, absence of sodium trithiocarbonate. The addition of soluble zinc salts to normal viscose will not accomplish the objects of the invention; the zinc will be precipitated by the trithiocarbonate present in the viscose in the form of an insoluble salt and thus made inactive. Nor can the objects of the invention be accomplished by adding an excess of a zinc salt to an unpurified or normal viscose solution. This might possibly be explained by the presence of the sodium trithiocarbonate or possibly because a disadvantageous effect is created by either the reaction product of trithiocarbonate and zinc or the high content of neutral salts formed from the excess zinc salt.

On the other hand, the purification of the viscose does not have to be continued until the last traces of sodium trithiocarbonate have been removed. The objects of the invention may be accomplished even though the viscose contains a small amount of sodium trithiocarbonate if a suitable amount of zinc is present. It is to be emphasized, however, that some, and preferably substantially all, of the sodium trithiocarbonate must be removed in order to successfully practice the invention.

The special viscose required for manufacturing products according to this invention may be pepared by washing xanthated alkali cellulose with a solution which will remove the sodium trithiocarbonate and in which the cellulose xanthate does not dissolve, treating the washed cellulose xanthate with a dilute solution of a zinc salt, removing the excess zinc solution, and dissolving the resulting product in an alkaline solution.

Alternatively, the cellulose xanthate may be washed to remove the trithiocarbonate and then dissolved in a zinc-containing alkaline solution in order to prepare the special viscose required for the practice of the invention.

In another embodiment, the trithiocarbonate-free, zinc-containing special viscose may be prepared from normal viscose. This is accomplished by coagulating the normal viscose without noticeable decomposition, washing the coagulate to remove sodium trithiocarbonate, removing excess wash liquid, and treating with a dilute solution of a zinc salt. After removing the excess of the zinc salt solution, the coagulate, which is now loaded with zinc, is dissolved in an alkaline solution.

If desired, the embodiment described in the preceding paragraph may be varied by dissolving the coagulate, which has been washed to remove sodium trithiocarbonate, in a zinc-containing alkaline solution to obtain the special viscose for manufacturing products according to the invention.

One way of preparing the trithiocarbonate-free, zinc-containing special viscose from normal viscose is by extruding it through spinnerets in the presence of a coagulating agent to form xanthate threads. Various mild coagulating agents can be used for this purpose, such as a solution of ammonium sulphate, ammonium chloride or sulphite. Gaseous coagulating agents, such as sulphurous acid or carbonic acid, may also be used. The coagulated xanthate thread is next treated to remove sodium trithiocarbonate and then loaded with zinc. The removal of the sodium trithiocarbonate from the xanthate thread may be accomplished by washing with a dilute, weak coagulating agent, for example, a solution of ammonium sulphate or sodium sulphate.

In order to load the purified cellulose xanthate thread with zinc, a dilute zinc salt solution such as zinc sulphate solution may be used. The coagulated xanthate absorbs from the solution about one atom of zinc for each two xanthate groups. The zinc salt solution which is used then must contain at least this required amount of zinc. If the purified xanthate thread is being dissolved in a zinc-containing alkaline solution to obtain the special viscose, similar considerations apply. In general, xanthate which has reached a higher degree of ripeness absorbs a relatively smaller amount of zinc than does less ripened xanthate.

The trithiocarbonate-free, zinc-containing viscose is spun as soon as possible after it has been prepared in order to prevent the formation of additional sodium trithiocarbonate.

In general, the specially prepared vicose may be spun into any normal spin bath to obtain a product having a uniform molecular structure over the entire cross-section and uniform properties over the entire cross-section with regard to swelling, permeability to liquids, optical behavior, and absorption and retention of dye stuffs. However, the particular properties obtained in the finished product are largely dependent on the spinning method used and the composition of the spinning bath.

The specially prepared viscose products may be processed in a number of ways depending on the properties desired in the finished products. If the special viscose is spun into a weakly decomposing, but strongly coagulating primary bath such as an ammonium sulphate bath, and this is followed by a secondary, acid-containing decomposition bath, the products which are obtained have a uniform molecular structure over the entire cross-section, but the retention of dye stuffs over the entire cross-section is uniformly low and of the same order of magnitude as that of the "core" section of viscose tire yarns. Thread manufactured in this manner is said to have a "core character" over its entire cross-section.

Products having completely different properties are obtained if a typical sulphuric acid spin bath is used. For example, the specially prepared viscose may be formed into threads using a single bath for coagulation and decomposition, such as one containing 70–80 gms. per liter of sulphuric acid, 180 gms. per liter of sodium sulphate, 50 gms. per liter of magnesium sulphate, and 10 gms. per liter of zinc sulphate. The thread obtained by spinning the specially prepared viscose into such a bath has a uniform molecular structure over the entire cross-section, but the retention of dye stuffs over the entire cross-section is approximately three times as high as that of the thread manufactured according to the process described in the preceding paragraph.

Products having very desirable properties may be obtained from the specially prepared viscose by the use of a primary bath which contains an organic acid such as acetic or formic acid as a coagulating and slowly decomposing agent, and a second bath which contains sulphuric acid and the usual salts. Particularly good results are obtained by the use of a primary bath containing acetic acid at a normality of at least 1.5. The dye retention of viscose threads obtained according to this embodiment is extremely large. The molecular structure of such threads is uniform over the entire cross-section and the properties are similar to those found in the "skin" layer of viscose tire yarn. The dye retention over the entire cross-section of such yarn is at least five to six times greater than that of the threads manufactured by using the ammonium sulphate primary bath described above.

It is apparent from the foregoing that the character of the products obtained varies step-wise from "skin character" to "core character" as the spinning conditions are changed from the last described organic acid bath, via the conventional sulphuric acid bath, to the ammonium sulphate bath or its equivalent. The uniform properties of the products, which are of course dependent on the structure, also change in this order.

The ability of the products to retain dye stuffs is somewhat reduced by the presence of salts in the spin bath. Salts in the viscose appear to have the same effect. However, small amounts of sodium sulphate which are introduced into the viscose via the zinc sulphate treatment, have no significant effects on the dye retention. It has also been observed that the dye retention is decreased by higher spin bath temperatures. Stretching of the products, on the other hand, increases the dye retention and consequently the "skin character" of the products. When manufacturing rayon threads according to the present invention the dye retention increases with increased spinning speeds and increases still more when the thread is stretched before it is completely decomposed. The freshly spun thread can be stretched well in the air, but more favorable results are obtained when it is stretched in a hot medium such as an aqueous solution above 60° C. or preferably above 80° C.

The following observations may be made with regard to the swelling of freshly spun threads made in accordance with the invention. When using the primary spin bath containing acetic acid, the freshly spun threads show a swelling of 92% before stretching. During stretching, the swelling of the threads decreases to 60–80% depending on the amount of stretch applied. Similar phenomena occur in the case of other products manufactured with different coagulation and decomposition baths while using the specially prepared viscose of the invention. In contrast to this, freshly spun threads from a normal viscose usually swell around 180% and this swelling changes relatively little during stretching.

To determine the nature of the properties of the products manufactured according to the present invention, experiments were conducted to measure the ability of the products to retain dye stuffs or their resistance to the washing out of dye stuffs. For these experiments a cross-section of thread was placed on a slide and dyed for one hour with a 2% aqueous solution of Victoria Blue B-base (colour index No. 729). The adhering dye stuff was removed and the thread and the slide were dried. The cross-section of thread was then treated from above with 84% alcohol by vol. and the time measured in which certain portions of the cross-section became colorless. In the case of normal viscose tire yarn, the time required for washing out the dye from the core and skin portions was five minutes and thirty-five minutes, respectively. With viscose rayon yarn of the same type manufactured in accordance with the present invention, the time for washing out the dye from the core was equal to that for the skin.

The following examples are given to elucidate the invention and are not to be construed in any sense as limiting.

*Example 1*

1.2 kg. of alkali cellulose containing 33% cellulose and 15.2% NaOH were xanthated in the conventional way using 33% $CS_2$, based on the cellulose. The xanthated alkali cellulose (yellow crumbs) obtained was treated three times with a saturated solution of $NH_4Cl$ which was drawn off and discarded after each treatment. Next the yellow crumbs were washed with a 8% $NH_4Cl$ solution, after which the liquid was removed by applying suction and centrifuging the yellow crumbs.

The washed product, which was free of sodium trithiocarbonate, weighed 1.05 kg. and contained 384 gms. of cellulose in the form of cellulose xanthate. This product was dissolved in 3.75 kg. of zincate lye containing 9.1% NaOH and 2% zinc. This solution was filtered, deaerated, and spun at a speed of 60 meters per minute into a coagulation bath of the following composition:

100 gms./l. of $H_2SO_4$
175 gms./l. of $Na_2SO_4$
50 gms./l. of $MgSO_4$ and 10 gms./l. of $ZnSO_4$ No after-stretching took place outside the bath. The thread was aftertreated and dried in the usual manner and was found to have the following mechanical properties:

Dry strength _____ 208 gms. per 100 denier.
Wet strength _____ 91 gms. per 100 denier.
Dry elongation _____ 14%.
Wet elongation _____ 16.7%.

Upon dyeing with Victoria Blue B-base (colour index No. 729), a completely homogeneous dyeing was obtained with no differences between the skin and core of the thread.

Example 2

1.2 kg. of alkali cellulose were xanthated and treated three times with a saturated solution of $NH_4Cl$, as in Example 1. After removing the treating liquid, the crumbs were washed with a solution of 2% NaCl, after which they were centrifuged.

The crumbs were dissolved in 3.75 kg. of zincate lye containing 7.5% NaOH and 2% zinc to obtain a spinning solution containing 8% cellulose and 7% NaOH. The solution was filtered, deaerated, and spun at 90 meters per minute into a bath of the following composition:

109 gms./l. of $H_2SO_4$
175 gms./l. of $Na_2SO_4$
50 gms./l. of $MgSO_4$ and 28 gms./l. of $ZnSO_4$ The thread leaving the spinning bath was guided through a second bath containing 1% $H_2SO_4$ at 90° C., in which the thread was stretched 94%. After treatment was conventional.

The thread obtained had the following mechanical properties:

Dry strength_____ 266 gms. per 100 denier.
Wet strength_____ 156 gms. per 100 denier.
Dry elongation_____ 8.9%.
Wet elongation_____ 8.5%.

When dyed with Victoria Blue B-base, the cross-section of the thread showed a completely homogeneous dyeing. Upon washing out the thread, it appeared that the homogeneous structure was intermediate to the structures found in the core and in the skin of a normal thread spun in a bath of similar composition.

Example 3

A ripened normal viscose containing 8% cellulose and 4.8% NaOH was passed through spinnerets having holes 0.5 mm. in diameter into a stationary washing centrifuge containing 20% ammonium sulphate. The viscose was passed through the spinnerets at a speed of 5 meters per minute. The threads fell freely into the ammonium sulphate bath and the ammonia vapors which developed were drawn off and recovered.

After the centrifuge had been filled, the spinning was discontinued and the thread mass allowed to stand for an additional five minutes to complete the coagulation. Then the coagulation liquid was withdrawn and the thread mass centrifuged. Next the centrifuge was filled with a solution of 10% ammonium sulphate which was allowed to stand in contact with the thread mass for five minutes, after which the liquid was withdrawn and the thread mass again centrifuged.

The thread mass in the centrifuge was next treated for 15 minutes with a solution of 1.5% zinc sulphate, after which the liquid was withdrawn. This treatment was repeated twice, after which the thread mass was centrifuged. It was found that the xanthate had absorbed about one atom of zinc per two xanthate groups. Thus, at a xanthate ratio of 0.33 the amount of zinc absorbed was 6.7–7%, calculated on cellulose.

The thread mass obtained was placed in a vessel containing 30% NaOH and allowed to stand for 30 minutes. Stirring was then commenced and continued for a period of one hour, during which time water was added so that a special trithiocarbonate-free viscose was obtained having the following composition:

Cellulose _____percent__ 8
NaOH _____do____ 7
Zinc in combined form_____do____ 0.8
Xanthate ratio _____ 0.33

The special viscose was spun to threads with a filament denier of 3, using two baths arranged in series. The first bath contained 360 gms. per liter of acetic acid and 100 gms. per liter of sodium acetate, and was maintained at a temperature of 20° C. The second bath contained 5 gms. per liter of sulphuric acid and small amounts of sodium sulphate and was maintained at a temperature of 90° C. The thread was stretched 150% in the second bath, after which it was collected in a rotating centrifuge. The collected cake was given the usual aftertreatment and dried. The resultant thread had a dry strength of 300 gms. per 100 denier, a wet strength of 180 gms. per 100 denier, and an elongation of 7%.

The thread obtained had a dull appearance resembling natural silk, and the cross-section was circular. Over its entire cross-section the thread had a uniform molecular structure, with a typical "skin character." The entire cross-section of the thread was similar to the skin of rayon tire yarn manufactured from normal viscose. In all parts from the outside to the inside the thread showed the same permeability, the same absorption and retention of dyes, and the same swelling characteristics. The X-ray diagram over the whole cross-section was diffused. Even without desulphurization, the sulphur content of the entire thread was low.

Example 4

A special trithiocarbonate-free, zinc-containing viscose, prepared as in Example 3 above, was spun into a single spin bath of the following composition:

80 gms./l. sulphuric acid
180 gms./l. sodium sulphate
50 gms./l. magnesium sulphate, and 8 gms./l. zinc sulphate The bath temperature was maintained at 45° C. and the thread was stretched 90% in this bath. The rayon cake which was collected was aftertreated and dried in the conventional manner. The thread obtained had the following mechanical properties:

Dry strength_____ 270 gms. per 100 denier.
Wet strength_____ 150 gms. per 100 denier.
Dry elongation_____ 13%.
Wet elongation_____ 14%.

This thread had very few differences between the core and the skin, and the properties, measured in terms of dye retention, lay in between those of the skin and the core of normal rayon tire yarn.

Example 5

A special trithiocarbonate-free, zinc-containing viscose, prepared as in Example 3, was spun into a primary spin bath of the following composition:

5 gms./l. sulphuric acid
200 gms./l. sodium sulphate, and 200 gms./l. ammonium sulphate The temperature of this bath was maintained at 45° C. The thread was guided through a second bath of the following composition:

15 gms./l. sulphuric acid
50 gms./l. ammonium sulphate and 50 gms./l. sodium sulphate The thread was stretched 60% in the second bath, after which it was collected in cake form, aftertreated, and dried as usual.

The thread obtained had a strength equal to that of normal rayon but did not have a skin-core difference. The entire thread had the characteristics of the core portion of a normal rayon thread and a correspondingly poor retention of dye stuffs. The other properties were also similar to those of a thread from the core portion of normal rayon.

Elaborate experiments have shown that the results achieved by the present invention are due to reactions which take place in the spinning threads after they leave the spinneret, and in particular at a distance from the spinneret when the pH value in the thread changes from 7 to about 2.

In the special viscose made according to the invention, zinc is at first present in dissolved form as $Zn(ONa)_2$. During coagulation of the viscose, as soon as the pH of the cellulose xanthate has dropped to about 7, the zinc ions start participating in the reaction by forming cross-links between the xanthate molecules. In this way, the zinc ions repel the formation of secondary valence bonds between the chains while at the same time forming a structural network entirely different from that which would be formed if zinc and trithiocarbonate were both present. Such a network obtained from viscose characterized by the presence of zinc and the absence of trithiocarbonate, is different from the network obtained from any viscose in which these two requirements are not satisfied. The net-forming action of the zinc ions is optimum in the range between pH6 and pH2.

The zinc must be evenly distributed in the spinning solution before the pH of the xanthate changes from 7 to 2. It has been found that at pH values between 7 and 2 the zinc ions cannot diffuse in the xanthate and become evenly distributed therein with the required speed. During the spinning process, the diffusion speed of the zinc ions in the coagulate is too slow to obtain an even distribution of the zinc in the thread within the available time.

The products obtained according to the invention show unusual and remarkable properties during, as well as after, the time they are made. Since there is a minimum of trithiocarbonate present in the viscose, very little carbon disulphide is developed during coagulation, and no sulphides are formed in the treatment bath even when the conditions are otherwise very favorable for this. Since little or no sulphur is separated on and in the coagulated products, there is little need for desulphurization treatment. Carbon disulphide, which is split off in the usual way during the decomposition of the xanthate, is obtained in a much purer form due to the absence of impurities. The shape of the cross-section of threads made in accordance with the invention is approximately circular, even when using spin baths which give a strongly serrated cross-section with normal viscose.

Products manufactured according to the invention have a uniform structure from skin to core and the ability to retain dye stuffs is uniform over the entire cross-section. As explained above, the particular properties obtained in the products may be varied over a wide range by varying the composition of the spin bath and the method of spinning.

When the special viscose of the invention is formed into threads by using a primary bath containing acetic acid, the threads obtained are characterized by a dull luster resembling that of natural silk.

While several embodiments and illustrations of the invention have been given, other variations will be apparent upon reading the foregoing description. For example, the methods disclosed for removing sodium trithiocarbonate from cellulose xanthate are not the only operable embodiments. Trithiocarbonate-free cellulose xanthate may also be obtained by dialysis of normal viscose. Many other changes and modifications may be made in the details disclosed herein without departing from the nature or the spirit of the invention. It is therefore to be understood that the invention is not limited except to the extent defined in the following claims.

What is claimed is:

1. A process for manufacturing viscose rayon yarn having uniform core-skin properties comprising the steps of preparing xanthated alkali cellulose, extruding said xanthated alkali cellulose into a coagulating agent to form a thread, washing said coagulated thread with a liquid in which the xanthated alkali cellulose does not dissolve to remove sodium trithiocarbonate, contacting said washed coagulated thread with a dilute zinc salt solution to incorporate zinc salt therein, dissolving the treated thread in a solution of sodium hydroxide, and spinning the resultant zinc-containing substantially trithiocarbonate-free cellulose xanthate solution to form viscose rayon yarn.

2. An aqueous zinc-compound-containing substantially trithiocarbonate-free cellulose xanthate alkali-containing spinning solution.

References Cited in the file of this patent

UNITED STATES PATENTS

| | | |
|---|---|---|
| 1,121,605 | Bernstein | Dec. 22, 1914 |
| 2,080,832 | Osgood et al. | May 18, 1937 |
| 2,419,341 | Edelstein | Apr. 22, 1947 |
| 2,594,496 | Richter, Jr. | Apr. 29, 1952 |